(12) United States Patent
Kaneko et al.

(10) Patent No.: US 9,196,926 B2
(45) Date of Patent: Nov. 24, 2015

(54) GEL ELECTROLYTE FOR LITHIUM ION SECONDARY BATTERY, AND LITHIUM ION SECONDARY BATTERY

(75) Inventors: Shinako Kaneko, Kanagawa (JP);
Yasutaka Kono, Kanagawa (JP);
Hitoshi Ishikawa, Kanagawa (JP)

(73) Assignee: NEC ENERGY DEVICES, LTD., Kanagawa (JP)

(*) Notice: Subject to any disclaimer, the term of this patent is extended or adjusted under 35 U.S.C. 154(b) by 399 days.

(21) Appl. No.: 13/883,953

(22) PCT Filed: Dec. 22, 2011

(86) PCT No.: PCT/JP2011/079795
§ 371 (c)(1),
(2), (4) Date: May 7, 2013

(87) PCT Pub. No.: WO2012/090855
PCT Pub. Date: Jul. 5, 2012

(65) Prior Publication Data
US 2013/0230779 A1    Sep. 5, 2013

(30) Foreign Application Priority Data
Dec. 27, 2010 (JP) .................................. 2010-290545

(51) Int. Cl.
*H01M 6/14* (2006.01)
*H01M 6/18* (2006.01)
(Continued)

(52) U.S. Cl.
CPC ...... *H01M 10/0565* (2013.01); *H01M 10/0525* (2013.01); *Y02E 60/122* (2013.01)

(58) Field of Classification Search
CPC .................. H01M 10/0525; H01M 10/0565; Y02E 60/122

USPC ................. 429/303, 314; 526/317.1, 332
See application file for complete search history.

(56) References Cited

U.S. PATENT DOCUMENTS

2007/0212613 A1* 9/2007 Ishida et al. ............... 429/303

FOREIGN PATENT DOCUMENTS

| CN | 101033323 A | 9/2007 |
| CN | 101557019 A | 10/2009 |

(Continued)

OTHER PUBLICATIONS

Communication dated Dec. 23, 2014 from the State Intellectual Property Office of the People's Republic of China in counterpart application No. 201180062840.5.

(Continued)

*Primary Examiner* — William Cheung
(74) *Attorney, Agent, or Firm* — Sughrue Mion, PLLC

(57) ABSTRACT

An object of the present invention is to provide a gel electrolyte for a lithium ion secondary battery having flame retardancy over a long period and a good capacity maintenance rate. The gel electrolyte for a lithium ion secondary battery according to the exemplary embodiment contains a lithium salt, a copolymer of at least one first monomer selected from compounds represented by chemical formulae (1) and (2) and a second monomer represented by chemical formula (4), at least one oxo-acid ester derivative of phosphorus selected from compounds represented by chemical formulae (5) to (7), and at least one disulfonate ester selected from a cyclic-chain type disulfonate ester represented by chemical formula (8) and a linear-chain type disulfonate ester represented by chemical formula (9).

11 Claims, 2 Drawing Sheets

(51) Int. Cl.
*C08F 20/06* (2006.01)
*C08F 16/12* (2006.01)
*H01M 10/0565* (2010.01)
*H01M 10/0525* (2010.01)

(56) References Cited

FOREIGN PATENT DOCUMENTS

| | | |
|---|---|---|
| JP | 10-255839 A | 9/1998 |
| JP | 2908719 B2 | 6/1999 |
| JP | 2002110245 A | 4/2002 |
| JP | 3422769 B2 | 6/2003 |
| JP | 3425493 B2 | 7/2003 |
| JP | 2003-238821 A | 8/2003 |
| JP | 3821495 B2 | 9/2006 |
| JP | 2006-286277 A | 10/2006 |
| JP | 2007-059192 A | 3/2007 |
| JP | 2007-115583 A | 5/2007 |
| JP | 3961597 B2 | 8/2007 |
| JP | 2007-258067 A | 10/2007 |
| JP | 2008-021560 A | 1/2008 |
| JP | 2008-071559 A | 3/2008 |
| JP | 2009-277397 A | 11/2009 |
| WO | 2011/099580 A1 | 8/2011 |

OTHER PUBLICATIONS

International Search Report of PCT/JP2011/079795 dated Apr. 3, 2012.

* cited by examiner

GEL ELECTROLYTE FOR LITHIUM ION SECONDARY BATTERY, AND LITHIUM ION SECONDARY BATTERY

CROSS REFERENCE TO RELATED APPLICATIONS

This is a National Stage of International Application No. PCT/JP2011/079795 filed Dec. 22, 2011, claiming priority based on Japanese Patent Application No. 2010-290545filed Dec. 27, 2010, the contents of all of which are incorporated herein by reference in their entirety.

TECHNICAL FIELD

The present invention relates to a gel electrolyte for a lithium ion secondary battery, and a battery having the same, and particularly to a lithium ion battery concurrently having high safety and good life characteristics.

BACKGROUND ART

Since lithium ion or lithium secondary batteries can achieve high energy density, these attract attention as power sources for cell phones and notebook computers, and additionally also as large power sources for electricity storage and power sources for automobiles.

Although lithium ion or lithium secondary batteries can achieve high energy density, up-sizing makes the energy density gigantic, and higher safety is demanded. For example, in large power sources for electricity storage and power sources for automobiles, especially high safety is demanded. Therefore, there are applied safety measures including the structural design of cells, packages and the like, protection circuits, electrode materials, additives having an overcharge protection function, the reinforcement of shutdown function of separators, and the like, thus securing the safety of secondary batteries.

Lithium ion secondary batteries use aprotic solvents such as cyclic carbonates and chain carbonates as an electrolyte solution solvent, and these carbonates tend to have a low flash point and be combustible though having a high dielectric constant and a high ionic conductivity of lithium ions.

A technology is known which uses as an additive a substance which is reductively decomposed at a higher potential than those of carbonates used as electrolyte solution solvents and forms an SEI (Solid Electrolyte Interface) that is a protection membrane having a high lithium ion permeability. The SEI has large effects on the charge/discharge efficiency, the cycle characteristics and the safety. The SEI can reduce the irreversible capacity of carbon materials and oxide materials.

As one of means to further enhance the safety of lithium ion secondary batteries, there is a method in which electrolyte solutions are made to be flame retardant. Patent Literature 1 discloses an organic electrolyte solution secondary battery which uses a phosphate triester as a main solvent of an organic electrolyte solution and in which negative electrode contains a carbon material as a main constituting element. Patent Literature 2 discloses that the use of a phosphate triester as an organic solvent of an electrolyte solution can improve the safety.

Patent Literature 3 discloses a secondary battery in which a nonaqueous electrolyte solution contains at least one selected from the group consisting of phosphate esters, halogen-substituted phosphate esters and condensed phosphate esters. Patent Literature 4 discloses that the use of a mixed solvent of a specific halogen-substituted phosphate ester compound and a specific ester compound as an electrolyte solution solvent can provide an electrolyte solution which has a low viscosity and excellent low-temperature characteristics.

Patent Literature 5 discloses a production method of a battery which uses a nonaqueous electrolyte solution added with a vinylene carbonate and 1,3-propane sultone. Patent Literature 6 discloses a battery which has a nonaqueous electrolyte solution which contains a predetermined amount of phosphate esters having a fluorine atom in the molecular chain, and in which a concentration of a salt is 1 mol/L or higher, and which viscosity is lower than 6.4 mPa·s. It is assumed that making such a constitution can provide a battery having flame retardancy, self-extinguishability and high-rate charge/discharge characteristics.

Patent Literature 7 discloses a nonaqueous electrolyte solution which contains at least one phosphate ester derivative represented by a predetermined formula, a nonaqueous solvent and a solute. Patent Literature 8 discloses that the use of a fluorophosphate ester compound for a nonaqueous electrolyte solution can provide an electrolyte solution which is excellent in conductivity and reduction resistance, and which develops high flame retardancy even in a low amount blended.

Patent Literature 9 discloses an electrolyte solution which contains a solvent containing a halogenated ethylene carbonate, a phosphate ester, and at least one phosphorus-containing compound selected from the group consisting of phosphate esters and phosphazene compounds. It disclosed that the use of the electrolyte solution can improve chemical stability in high temperatures. Patent Literature 10 discloses a nonaqueous electrolyte solution in which a lithium salt is dissolved in a nonaqueous solvent containing a phosphate ester compound, a halogen-containing cyclic carbonate ester and a chain carbonate ester. Patent Literature 11 discloses a nonaqueous electrolyte solution which contains an organic solvent containing a predetermined amount of a fluorine-containing phosphate ester represented by a predetermined formula, and an electrolyte salt. It disclosed that the electrolyte solution has the noncombustibility and flame retardancy useful for an electrolyte solution of a lithium secondary battery, has a high solubility of the electrolyte salt, has a large discharge capacity, and is excellent in charge/discharge cycle characteristics.

Patent Literature 12 describes a composition for a polymer solid electrolyte containing a fluorine-containing phosphate ester. The Patent Literature discloses a polymer crosslinking material composed of a combination of an epoxy group- and/or an oxetane ring-containing polymer, and a cationic polymerization initiator.

CITATION LIST

Patent Literature

Patent Literature 1: JP2908719B
Patent Literature 2: JP3425493B
Patent Literature 3: JP10-255839A
Patent Literature 4: JP3821495B
Patent Literature 5: JP2007-059192A
Patent Literature 6: JP2007-258067A
Patent Literature 7: JP3422769B
Patent Literature 8: JP2006-286277A
Patent Literature 9: JP2007-115583A
Patent Literature 10: JP3961597B
Patent Literature 11: JP2008-21560A
Patent Literature 12: JP2003-238821A

SUMMARY OF INVENTION

Technical Problem

However, in Patent Literatures 1 and 2, a phosphate ester is reductively decomposed on a carbon negative electrode during a long-period usage, and an increase of resistance occurs due to depositing the reduced substance on the electrode, and an increase of resistance occurs due to gas generation, and thereby may decrease battery characteristics in some cases. A further problem is that a phosphate ester is reductively decomposed during usage, and the suppression effect of the combustion of the electrolyte solution is decreased in some cases.

Patent Literatures 3 to 8, though having descriptions of combustibility of an electrolyte solution and initial characteristics of a battery, do not refer to the long-period reliability of the battery. Further, there is a problem that also a halogen-substituted phosphate ester and a derivative thereof are reductively decomposed gradually on a negative electrode during a long-period usage, and a decrease in battery characteristics may occur due to an increase of resistance in some cases, and as a result of the reductive decomposition, the suppression effect of the combustion of the electrolyte solution may be decreased in some cases. Particularly even in the case where vinylene carbonate or 1,3-propane sultone as an additive is added in order to form an SEI as described in Patent Literature 5, sufficient life may not be provided in some cases. The Literatures do not referred to the suppression effect of the combustion over a long period.

Patent Literatures 9 to 11 have a description that a halogen-substituted cyclic carbonate ester can form a halogen-containing film on a negative electrode, and the reductive decomposition of a phosphate ester or a halogen-substituted phosphate ester can be suppressed. However, if the reductive decomposition of a phosphate ester or a halogen-substituted phosphate ester is attempted to be suppressed over a long period by a halogen-substituted cyclic carbonate ester alone, a very large amount of the halogen-substituted carbonate ester is needed, thereby may cause a decrease of the ionic conductivity in an electrolyte solution in some cases. Further a large an increase of resistance and a decrease in the capacity maintenance rate may be caused in a long period in some cases.

Furthermore, since any of Patent Literatures 1 to 11 relate to an electrolyte solution, the problem of solution leakage is apprehended. By contrast, Patent Literature 12 has a description of a polymer solid electrolyte or a polymer gel electrolyte. However, in a battery described in Patent Literature 12, even if the flame retardancy of an electrolyte itself is maintained initially, a fluorine-containing phosphate ester is decomposed on a negative electrode as in Patent Literatures 9 to 11, and the deposition of Li is induced, and therefore the safety as a cell cannot be maintained in some cases.

Then, an object of an exemplary embodiment is to provide a gel electrolyte for a lithium ion secondary battery which has flame retardancy over a long period and a good capacity maintenance rate.

Solution to Problem

One of the exemplary embodiments is a gel electrolyte for a lithium ion secondary battery, comprising:
a lithium salt;
a copolymer of at least one first monomer selected from compounds represented by chemical formulae (1) and (2) and a second monomer represented by chemical formula (4);
at least one oxo-acid ester derivative of phosphorus selected from compounds represented by chemical formulae (5) to (7); and
at least one disulfonate ester selected from a cyclic-chain type disulfonate ester represented by chemical formula (8) and a linear-chain type disulfonate ester represented by chemical formula (9).

[Formula 1]

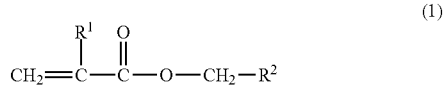
(1)

[Formula 2]

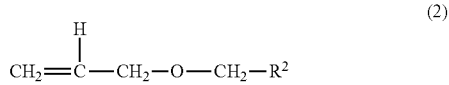
(2)

In formula (1), $R^1$ represents H or $CH_3$; and in formulae (1) and (2), $R^2$ represents one of substituents represented by the following formula (3).

[Formula 3]

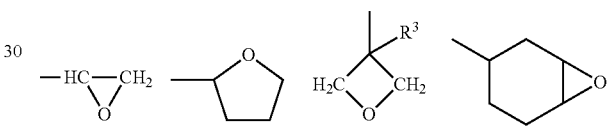
(3)

In formula (3), $R^3$ represents an alkyl group having 1 to 6 carbon atoms.

[Formula 4]

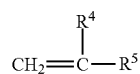
(4)

In formula (4), $R^4$ represents H or $CH_3$; $R^5$ represents —$COOCH_3$, —$COOC_2H_5$, —$COOC_3H_7$, —$COOC_4H_9$, —$COOCH_2CH(CH_3)_2$, —$COO(CH_2CH_2O)_nCH_3$, —$COO(CH_2CH_2O)_nC_4H_9$, —$COO(CH_2CH_2O)_nCH_3$, —$COO(CH_2CH(CH_3)O)_nCH_3$, —$COO(CH_2CH(CH3)O)_nC_2H_5$, —$OCOCH_3$, —$OCOC_2H_5$, or —$CH_2OC_2H_5$; and n represents an integer of 1 to 3.

[Formula 5]

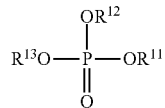
(5)

In formula (5), $R^{11}$, $R^{12}$ and $R^{13}$ each independently represent any group selected from an alkyl group, an aryl group, an alkenyl group, cyano group, phenyl group, an amino group, nitro group, an alkoxy group, a cycloalkyl group and a halogen-substituted group thereof. Two of or all of $R^{11}$, $R^{12}$ and $R^{13}$ may be bonded to form a ring structure.

[Formula 6]

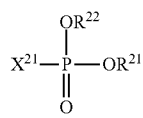

(6)

In formula (6), $R^{21}$ and $R^{22}$ each independently represent any group selected from an alkyl group, an aryl group, an alkenyl group, cyano group, phenyl group, an amino group, nitro group, an alkoxy group, a cycloalkyl group and a halogen-substituted group thereof. $R^{21}$ and $R^{22}$ may be bonded to form a ring structure. $X^{21}$ represents a halogen atom.

[Formula 7]

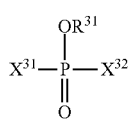

(7)

In formula (7), $R^{31}$ represents any group selected from an alkyl group, an aryl group, an alkenyl group, cyano group, phenyl group, an amino group, nitro group, an alkoxy group, a cycloalkyl group and a halogen-substituted group thereof. $X^{31}$ and $X^{32}$ each independently represent a halogen atom.

[Formula 8]

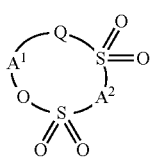

(8)

In formula (8), Q represents an oxygen atom, a methylene group or a single bond; $A^1$ represents a substituted or unsubstituted alkylene group which may be branched and has 1 to 5 carbon atoms, a carbonyl group, a sulfinyl group, a substituted or unsubstituted perfluoroalkylene group which may be branched and has 1 to 5 carbon atoms, a substituted or unsubstituted fluoroalkylene group which may be branched and has 2 to 6 carbon atoms, a substituted or unsubstituted alkylene group which contains an ether bond and may be branched and has 1 to 6 carbon atoms, a substituted or unsubstituted perfluoroalkylene group which contains an ether bond and may be branched and has 1 to 6 carbon atoms, or a substituted or unsubstituted fluoroalkylene group which contains an ether bond and may be branched and has 2 to 6 carbon atoms; and $A^2$ represents a substituted or unsubstituted alkylene group, a substituted or unsubstituted fluoroalkylene group or an oxygen atom.

[Formula 9]

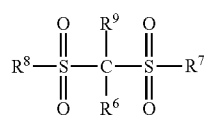

(9)

In formula (9), $R^6$ and $R^9$ each independently represent an atom or a group selected from hydrogen atom, a substituted or unsubstituted alkyl group having 1 to 5 carbon atoms, a substituted or unsubstituted alkoxy group having 1 to 5 carbon atoms, a substituted or unsubstituted fluoroalkyl group having 1 to 5 carbon atoms, a polyfluoroalkyl group having 1 to 5 carbon atoms, $—SO_2X_3$ (X3 is a substituted or unsubstituted alkyl group having 1 to 5 carbon atoms), $—SY^1$ ($Y^1$ is a substituted or unsubstituted alkyl group having 1 to 5 carbon atoms), $—COZ$ (Z is hydrogen atom or a substituted or unsubstituted alkyl group having 1 to 5 carbon atoms), and a halogen atom; and $R^7$ and $R^8$ each independently represent an atom or a group selected from a substituted or unsubstituted alkyl group having 1 to 5 carbon atoms, a substituted or unsubstituted alkoxy group having 1 to 5 carbon atoms, a substituted or unsubstituted phenoxy group, a substituted or unsubstituted fluoroalkyl group having 1 to 5 carbon atoms, a polyfluoroalkyl group having 1 to 5 carbon atoms, a substituted or unsubstituted fluoroalkoxy group having 1 to 5 carbon atoms, a polyfluoroalkoxy group having 1 to 5 carbon atoms, hydroxyl group, a halogen atom, $—NX^4X^5$ ($X^4$ and $X^5$ are each independently hydrogen atom or a substituted or unsubstituted alkyl group having 1 to 5 carbon atoms), and $—NY^2CONY^3Y^4$ ($Y^2$ to $Y^4$ are each independently hydrogen atom or a substituted or unsubstituted alkyl group having 1 to 5 carbon atoms).

One aspect of the exemplary embodiments is the gel electrolyte for a lithium ion secondary battery which comprises 5 to 60% by mass of the oxo-acid ester derivative of phosphorus.

One aspect of the exemplary embodiments is the gel electrolyte for a lithium ion secondary battery which comprises 0.05 to 10% by mass of the disulfonate ester.

One aspect of the exemplary embodiments is the gel electrolyte for a lithium ion secondary battery which comprises 0.5 to 20% by mass of a halogen-containing cyclic-chain type carbonate ester.

One aspect of the exemplary embodiments is a lithium ion secondary battery which comprises the gel electrolyte for a lithium ion secondary battery.

Advantageous Effects of Invention

An exemplary embodiment can provide a gel electrolyte for a lithium ion secondary battery which concurrently has high flame retardancy and a good capacity maintenance rate over a long period.

BRIEF DESCRIPTION OF DRAWINGS

FIG. 1(a) is a top plan view of the positive electrode, and FIG. 1(b) is a side view of the positive electrode.

FIG. 2(a) is a top plan view of the negative electrode, and FIG. 2(b) is a side view of the negative electrode.

DESCRIPTION OF EMBODIMENTS

Figure 1:
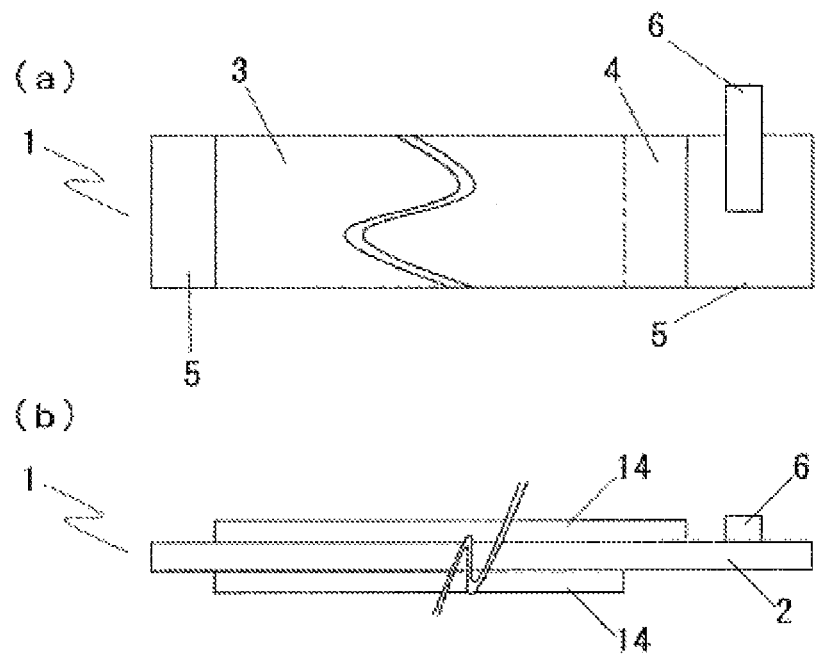
FIG. 1 is a schematic diagram to illustrate a constitution of a positive electrode of a lithium ion secondary battery.

Hereinafter, an exemplary embodiment will be described in detail.

A gel electrolyte for a lithium ion secondary battery according to the exemplary embodiment comprises a lithium salt, a copolymer as a gel component, an oxo-acid ester of phosphorus, and a disulfonate ester.

The copolymer is formed by polymerizing at least one first monomer selected from compounds having a ring-opening polymerizable functional group and represented by chemical formulae (1) and (2), and a second monomer having no ring-opening polymerizable functional group and represented by chemical formula (4). The ring-opening polymerizable functional group is represented by chemical formula (3).

[Formula 10]

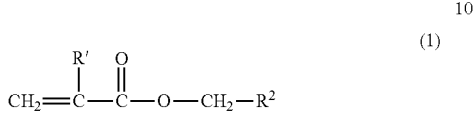
(1)

[Formula 11]

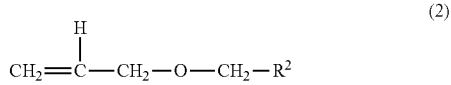
(2)

In formula (1), $R^1$ represents H or $CH_3$; and in formulae (1) and (2), $R^2$ represents one of substituents represented by the following chemical formula (3).

[Formula 12]

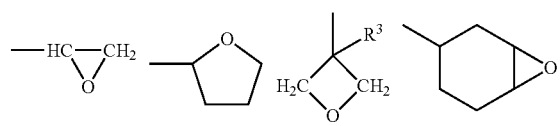
(3)

In formula (3), $R^3$ represents an alkyl group having 1 to 6 carbon atoms.

[Formula 13]

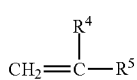
(4)

In formula (4), $R^4$ represents H or $CH_3$; $R^5$ represents —COOCH$_3$, —COOC$_2$H$_5$, —COOC$_3$H$_7$, —COOC$_4$H$_9$, —COOCH$_2$CH(CH$_3$)$_2$, —COO(CH$_2$CH$_2$O)$_n$CH$_3$, —COO(CH$_2$CH$_2$O)$_n$C$_4$H$_9$, —COO(CH$_2$CH$_2$CH$_2$O)$_n$CH$_3$, —COO(CH$_2$CH(CH$_3$)O)$_n$CH$_3$, —COO(CH$_2$CH(CH$_3$)O)$_n$C$_2$H$_5$, —OCOCH$_3$, —OCOC$_2$H$_5$, or —CH$_2$OC$_2$H$_5$; and n represents an integer of 1 to 3.

Examples of the first monomer represented by the above formula (1) or (2) include (3-ethyl-3-oxetanyl)methyl methacrylate, glycidyl methacrylate and 3,4-epoxycyclohexylmethyl methacrylate. These may be used singly or concurrently in two or more. Hereinafter, a monomer represented by the above formula (1) or (2) may be referred to as a monomer having a ring-opening polymerizable functional group.

Examples of the second monomer represented by the above chemical formula (4) include methyl acrylate, ethyl acrylate, methyl methacrylate, propyl methacrylate, methoxytriethylene glycol methacrylate and methoxydipropylene glycol acrylate. The monomer represented by the above formula (4) may be used singly or concurrently in two or more. Hereinafter, a monomer represented by the above formula (4) may be referred to as a monomer having no ring-opening polymerizable functional group.

An oxo-acid ester derivative of phosphorus in the exemplary embodiment is at least one compound represented by the following chemical formulae (5) to (7).

[Formula 14]

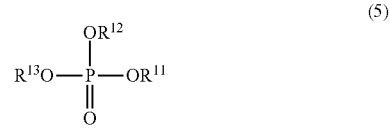
(5)

In formula (5), $R^{11}$, $R^{12}$ and $R^{13}$ each independently represent any group selected from an alkyl group, an aryl group, an alkenyl group, cyano group, phenyl group, an amino group, nitro group, an alkoxy group, a cycloalkyl group and a halogen-substituted group thereof. Two of or all of $R^{11}$, $R^{12}$ and $R^{13}$ may be bonded to form a ring structure.

[Formula 15]

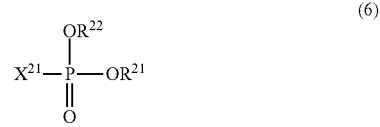
(6)

In formula (6), $R^{21}$ and $R^{22}$ each independently represent any group selected from an alkyl group, an aryl group, an alkenyl group, cyano group, phenyl group, an amino group, nitro group, an alkoxy group, a cycloalkyl group and a halogen-substituted group thereof. $R^{21}$ and $R^{22}$ may be bonded to form a ring structure. $X^{21}$ represents a halogen atom.

In formula (6), $X^{21}$ is preferably a fluorine atom.

[Formula 16]

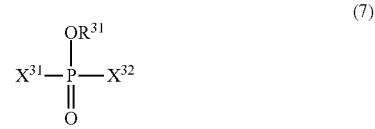
(7)

In formula (7), $R^{31}$ represents any group selected from an alkyl group, an aryl group, an alkenyl group, cyano group, phenyl group, an amino group, nitro group, an alkoxy group, a cycloalkyl group and a halogen-substituted group thereof. $X^{31}$ and $X^{32}$ each independently represent a halogen atom.

In formula (7), $X^{31}$ and $X^{32}$ may be identical or different. $X^{31}$ and $X^{32}$ are preferably fluorine atoms.

The oxo-acid ester derivative of phosphorus according to the exemplary embodiment may comprise at least one compound represented by one of formulae (5) to (7).

Specific examples of the compound represented by chemical formula (5) are not especially limited to the following, but include phosphate esters such as trimethyl phosphate, triethyl phosphate, tributyl phosphate, triphenyl phosphate, dimethyl ethyl phosphate, dimethyl propyl phosphate, dimethyl butyl phosphate, diethyl methyl phosphate, dipropyl methyl phosphate, dibutyl methyl phosphate, methyl ethyl propyl phosphate, methyl ethyl butyl phosphate and methyl propyl butyl phosphate. A phosphate ester having a halogen-substituted group includes tri(trifluoroethyl)phosphate, methyl(ditrifluoroethyl)phosphate, dimethyl(trifluoroethyl)phosphate, ethyl (ditrifluoroethyl)phosphate, diethyl(trifluoroethyl)phosphate, propyl(ditrifluoroethyl)phosphate, dipropyl(trifluoroethyl)phosphate, tri(pentafluoropropyl)phosphate, methyl(dipentafluoropropyl)phosphate, dimethyl(pentafluoropropyl)phosphate, ethyl(dipentafluoropropyl)phosphate, diethyl(pentafluoropropyl)phosphate, butyl(dipentafluoropropyl)phosphate and dibutyl(pentafluoropropyl)phosphate.

Specific examples of the compound represented by chemical formula (6) are not especially limited to the following, but include dimethyl fluorophosphonate, diethyl fluorophosphonate, dibutyl fluorophosphonate, diphenyl fluorophosphonate, methyl ethyl fluorophosphonate, methyl propyl fluorophosphonate, methyl butyl fluorophosphonate, ethyl methyl fluorophosphonate, propyl methyl fluorophosphonate, butyl methyl fluorophosphonate, ethyl propyl fluorophosphonate, ethyl butyl fluorophosphonate, propyl butyl fluorophosphonate, di(trifluoroethyl)fluorophosphonate, methyl trifluoroethyl fluorophosphonate, ethyl trifluoroethyl fluorophosphonate, propyl trifluoroethyl fluorophosphonate, di(pentafluoropropyl)fluorophosphonate, methyl pentafluoropropyl fluorophosphonate, ethyl pentafluoropropyl fluorophosphonate, butyl pentafluoropropyl fluorophosphonate, difluorophenyl fluorophosphonate and ethyl fluorophenyl fluorophosphonate.

Specific examples of the compound represented by chemical formula (7) are not especially limited to the following, but include methyl difluorohypophosphite, ethyl difluorohypophosphite, butyl difluorohypophosphite, phenyl difluorohypophosphite, propyl difluorohypophosphite, trifluoroethyl difluorohypophosphite, fluoropropyl difluorohypophosphite and fluorophenyl difluorohypophosphite.

The content of the oxo-acid ester derivative of phosphorus is preferably 5 to 60% by mass, and more preferably 10 to 40% by mass, based on the whole of a gel electrolyte. In the case where the content of the oxo-acid ester derivative of phosphorus is 5% by mass or higher based on a gel electrolyte, the suppression effect of the combustion of the electrolyte solution can be more effectively exerted. In the case where the content is 10% by mass or higher, the suppression effect of the combustion can become higher. In the case where the content of the oxo-acid ester derivative of phosphorus is 60% by mass or lower, an increase in resistance is suppressed, thereby improveing battery characteristics. Moreover, the effect of reducing reductive decomposition by the disulfonate ester can be easily realized, and the effect of suppressing the combustion over a long period can be easily realized.

A disulfonate ester in the exemplary embodiment is at least one selected from a cyclic-chain type disulfonate ester represented by chemical formula (8) and a linear-chain type disulfonate ester represented by chemical formula (9). The disulfonate ester contributes to the formation of an SEI. A disulfonate ester is preferably contained as an additive.

[Formula 17]

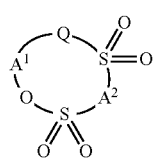
(8)

In formula (8), Q represents an oxygen atom, a methylene group or a single bond; $A^1$ represents a substituted or unsubstituted alkylene group which may be branched and has 1 to 5 carbon atoms, a carbonyl group, a sulfinyl group, a substituted or unsubstituted perfluoroalkylene group which may be branched and has 1 to 5 carbon atoms, a substituted or unsubstituted fluoroalkylene group which may be branched and has 2 to 6 carbon atoms, a substituted or unsubstituted alkylene group which contains an ether bond and may be branched and has 1 to 6 carbon atoms, a substituted or unsubstituted perfluoroalkylene group which contains an ether bond and may be branched and has 1 to 6 carbon atoms, or a substituted or unsubstituted fluoroalkylene group which contains an ether bond and may be branched and has 2 to 6 carbon atoms; and $A^2$ represents a substituted or unsubstituted alkylene group, a substituted or unsubstituted fluoroalkylene group or an oxygen atom.

[Formula 18]

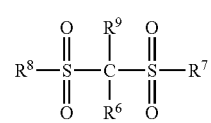
(9)

In formula (9), $R^6$ and $R^9$ each independently represent an atom or a group selected from hydrogen atom, a substituted or unsubstituted alkyl group having 1 to 5 carbon atoms, a substituted or unsubstituted alkoxy group having 1 to 5 carbon atoms, a substituted or unsubstituted fluoroalkyl group having 1 to 5 carbon atoms, a polyfluoroalkyl group having 1 to 5 carbon atoms, $-SO_2X^3$ (X3 is a substituted or unsubstituted alkyl group having 1 to 5 carbon atoms), $-SY^1$ ($Y^1$ is a substituted or unsubstituted alkyl group having 1 to 5 carbon atoms), $-COZ$ (Z is hydrogen atom or a substituted or unsubstituted alkyl group having 1 to 5 carbon atoms), and a halogen atom; and $R^7$ and $R^8$ each independently represent an atom or a group selected from a substituted or unsubstituted alkyl group having 1 to 5 carbon atoms, a substituted or unsubstituted alkoxy group having 1 to 5 carbon atoms, a substituted or unsubstituted phenoxy group, a substituted or unsubstituted fluoroalkyl group having 1 to 5 carbon atoms, a polyfluoroalkyl group having 1 to 5 carbon atoms, a substituted or unsubstituted fluoroalkoxy group having 1 to 5 carbon atoms, a polyfluoroalkoxy group having 1 to 5 carbon atoms, hydroxyl group, a halogen atom, $-NX^4X^5$ ($X^4$ and $X^5$ are each independently hydrogen atom or a substituted or unsubstituted alkyl group having 1 to 5 carbon atoms), and $-NY^2CONY^3Y^4$ ($Y^2$ to $Y^4$ are each independently hydrogen atom or a substituted or unsubstituted alkyl group having 1 to 5 carbon atoms).

Specific examples of a compound represented by chemical formula (8) are shown in Table 1, and specific examples of a compound represented by chemical formula (9) are shown in Table 2, but these compounds are not especially limited to these examples. These compounds may be used singly or concurrently in two or more.

TABLE 1

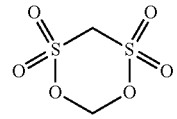
(1)

TABLE 1-continued
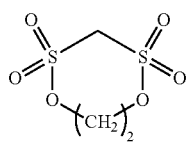 (2)
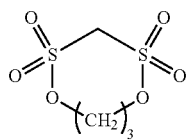 (3)
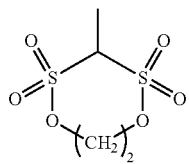 (4)
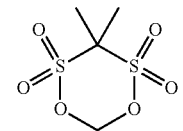 (5)
 (6)
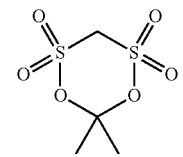 (7)
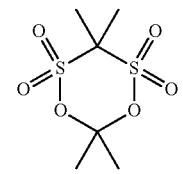 (8)
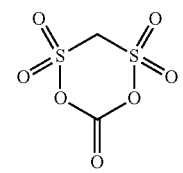 [SMILES: O=C1OS(=O)(=O)CS(=O)(=O)O1] (9)
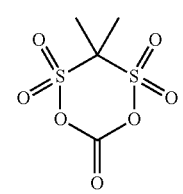 (10)
TABLE 1-continued
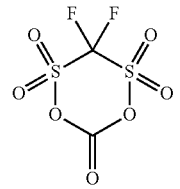 [SMILES: O=C1OS(=O)(=O)C(F)(F)S(=O)(=O)O1] (11)
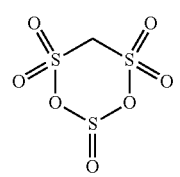 [SMILES: O=S1OS(=O)(=O)CS(=O)(=O)O1] (12)
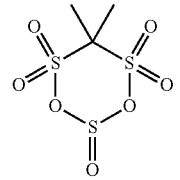 (13)
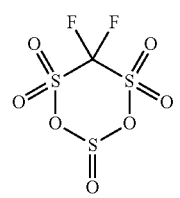 (14)
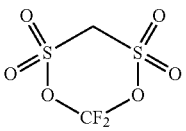 (15)
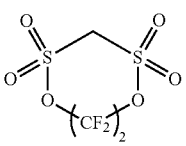 (16)
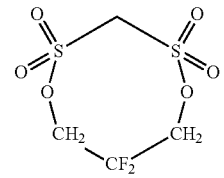 (17)
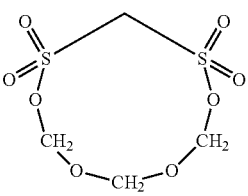 [SMILES: O=S1(=O)CS(=O)(=O)OCOCOCO1] (18)
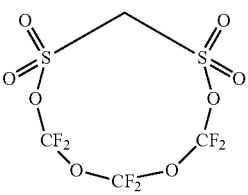 [SMILES: O=S1(=O)CS(=O)(=O)OC(F)(F)OC(F)(F)OC(F)(F)O1] (19)

| TABLE 1-continued | | TABLE 2-continued | |
|---|---|---|---|
| 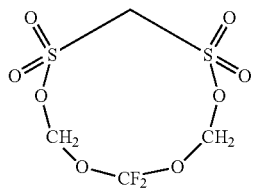 [SMILES: O=S1(=O)CS(=O)(=O)OCOC(F)(F)OCO1] | (20) |  | (107) |
| 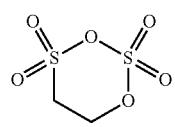 | (21) |  | (108) |
| 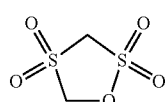 | (22) |  | (109) |
| TABLE 2 | |
|---|---|
|  (101) |  (110) |
| 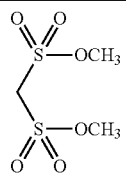 (102) |  (111) |
| 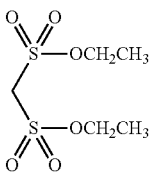 (103) |  (112) |
| 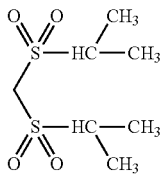 (104) |  (113) |
| 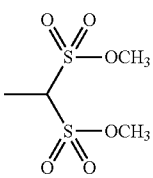 (105) |  (114) |
| 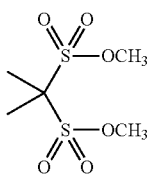 (106) |  (115) |

TABLE 2-continued

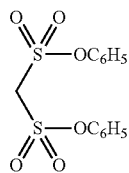
(116)

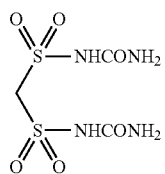
(117)

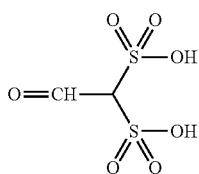 [SMILES: O=CC(S(=O)(=O)O)S(=O)(=O)O]
(118)

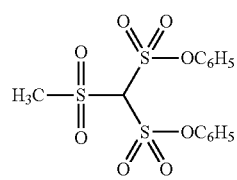
(119)

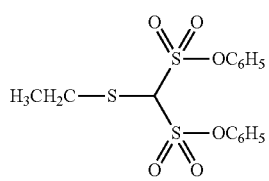
(120)

A compound represented by chemical formula (8) or chemical formula (9) can be obtained using a production method described in JP05-44946B.

The content of the disulfonate ester is preferably 0.05 to 10% by mass, and more preferably 0.1 to 5% by mass, based on the whole of the gel electrolyte. In the case where the content of the disulfonate ester is 0.05% by mass or higher, an effect of an SEI can be sufficiently obtained. In the case where the content of the disulfonate ester is 10% by mass or lower, the reductive decomposition of the oxo-acid ester of phosphorus can be suppressed over a long period, and an increase of resistance can be suppressed, thereby battery characteristics can be improved further.

An aprotic solvent may be contained in a gel electrolyte according to the exemplary embodiment. An aprotic solvent may be contained in an electrolyte for a lithium ion secondary battery according to the exemplary embodiment. The aprotic solvent includes cyclic-chain type carbonates such as propylene carbonate (PC), ethylene carbonate (EC), butylene carbonate (BC) and vinylene carbonate (VC), linear-chain type carbonates such as dimethyl carbonate (DMC), diethyl carbonate (DEC), ethyl methyl carbonate (EMC) and dipropyl carbonate (DPC), aliphatic carboxylate esters such as methyl formate, methyl acetate and ethyl propionate, γ-lactones such as γ-butyrolactone, linear-chain type ethers such as 1,2-ethoxyethane (DEE) and ethoxymethoxyethane (EME), cyclic-chain type ethers such as tetrahydrofuran and 2-methyltetrahydrofuran, dimethyl sulfoxide, 1,3-dioxolane, formamide, acetamide, dimethylformamide, dioxolane, acetonitrile, propylnitrile, nitromethane, ethylmonoglyme, phosphate triesters, trimethoxymethane, dioxolane derivatives, sulfolane, methylsulfolane, 1,3-dimethyl-2-imidazolidinone, 3-methyl-2-oxazolidinone, propylene carbonate derivatives, tetrahydrofuran derivatives, ethyl ether, anisole, N-methylpyrrolidone, and fluorocarboxylate esters. These aprotic organic solvents can be used singly or as a mixture of two or more, but are not limited thereto.

In a gel electrolyte according to the exemplary embodiment, a halogen-containing cyclic-chain type carbonate ester may further be contained as an additive. Since the addition of a halogen-containing cyclic-chain type carbonate ester to a gel electrolyte improves the ionic conductivity of an electrolyte solution and contributes to the formation of the film, battery characteristics can be maintained and the suppression effect of the combustion can be obtained over a long period. The halogen-containing cyclic-chain type carbonate ester includes, for example, a fluorine-containing carbonate. The fluorine-containing carbonate include linear-chain type one and cyclic-chain type one, and is preferably cyclic-chain type one (hereinafter, abbreviated also to fluorine-containing cyclic-chain type carbonate).

The content of a halogen-containing cyclic-chain type carbonate ester is preferably in the range of 0.5 to 20% by mass, more preferably 0.1 to 10% by mass, still more preferably 0.2 to 8% by mass, and especially preferably 1 to 5% by mass, based on the whole of a gel electrolyte.

The fluorine-containing cyclic-chain type carbonate is not especially limited, but compounds obtained by fluorinating part of propylene carbonate, vinylene carbonate and vinylethylene carbonate, and the like may be used. More specifically, for example, 4-fluoro-1,3-dioxolan-2-one (fluoroethylene carbonate, hereinafter, referred also to as FEC), (cis- or trans-)4,5-difluoro-1,3-dioxolan-2-one, 4,4-difluoro-1,3-dioxolan-2-one and 4-fluoro-5-methyl-1,3-dioxolan-2-one and the like can be used. Above all, fluoroethylene carbonate is preferable.

An electrolyte contained in a gel electrolyte according to the exemplary embodiment is not especially limited, but includes, for example, LiPF$_6$, LiBF$_4$, LiAsF$_6$, LiSbF$_6$, LiCl$_4$, LiAlCl$_4$, LiN(C$_n$F$_{2n+1}$SO$_2$)(C$_m$F$_{2m+1}$SO$_2$) (n and m are natural numbers), and LiCF$_3$SO$_3$.

A gel electrolyte according to the exemplary embodiment can be obtained, for example, by the following Step A and Step B. Step A: a step of synthesizing a copolymer of a first monomer represented by formula (1) or formula (2) and a second monomer represented by formula (4). Step B: a step of gelating a pregel solution comprising a lithium salt, the copolymer obtained in Step A, the oxo-acid ester derivative of phosphorus, the disulfonate ester, and the aprotic solvent in the presence of a cationic polymerization initiator.

In the above Step A, the copolymer can be synthesized using a radical polymerization initiator. The radical polymerization initiator includes azo-based initiators such as N,N-azobisisobutyronitrile and dimethyl N,N'-azobis(2-methylpropionate), and organic peroxide-based initiators such as benzoyl peroxide and lauroyl peroxide. Since such a radical polymerization initiator bonds to terminals of the copolymer of the first monomer represented by the above formula (1) or (2) and the second monomer represented by the above formula (4) along with the initiation of the reaction, and is thereby inactivated, the radical polymerization initiator never again causes any reaction by reheating after the completion of the reaction.

In the above Step B, the cationic polymerization initiator is not especially limited, but includes, for example, various types of onium salts (for example, cationic salts such as of ammonium and phosphonium, and anionic salts such as of —$BF_4$, —$PF_6$ and —$CF_3SO_3$), and lithium salts such as $LiBF_4$ and $LiPF_6$.

For a gel electrolyte according to the exemplary embodiment, no radical polymerization initiator such as an organic peroxide is needed in Step B of obtaining the gel electrolyte. Therefore, the oxo-acid ester derivative of phosphorus and the disulfonate ester are not decomposed in the gelation step. Additionally since the radical polymerization initiator is unnecessary for a battery, battery characteristics does not fall due to the influence of leftovers after the polymerization. Since a gel electrolyte poses no apprehension of solution leakage as compared to an electrolyte solution, and gives good close adhesivity between both electrodes of a positive electrode and a negative electrode and a separator, life characteristics good over a long period can be provided.

A gel electrolyte according to the exemplary embodiment can decrease the amount of gases generated at first-time charging, which is preferable also from the viewpoint of the safety. The reason of the decrease of the amount of gases generated is presumably because the concurrent presence of an oxo-acid ester derivative of phosphorus and a disulfonate ester in the gel electrolyte can form an SEI incorporating part of the oxo-acid ester derivative of phosphorus by a reaction mechanism which is different from an SEI formation by a gel electrolyte containing only a disulfonate ester. It is also presumed that since the reduction of the oxo-acid ester derivative of phosphorus present in the gel electrolyte can be suppressed on the SEI thus formed, the SEI by the disulfonate ester incorporating the oxo-acid ester derivative of phosphorus is firmly formed and the suppression effect of the reductive decomposition on some components including the oxo-acid ester derivative of phosphorus in the gel electrolyte probably becomes large. The effect presumably gives good life characteristics. High safety can further be provided over a long period because an oxo-acid ester derivative of phosphorus can be suppressed in reductive decomposition over a long period.

As a negative electrode active substance contained in a negative electrode of a lithium ion secondary battery having the gel electrolyte according to the exemplary embodiment, for example, one or two or more substances can be used which are selected from the group consisting of metallic lithium, lithium alloys and materials capable of occluding and releasing lithium. As the material capable of occluding and releasing lithium ions, a carbon material or an oxide can be used.

As the carbon materials, graphite, amorphous carbon, diamond-like carbon, carbon nanotubes and the like which occlude lithium, and composite materials thereof can be used. Particularly graphite is preferable because graphite has high electron conductivity, and is excellent in the adhesivity with a current collector composed of a metal such as copper, and in the voltage flatness, and contains only a low content of impurities because of being formed at a high treatment temperature, which are advantageous for improvement of the negative electrode performance. A composite material of a high-crystalline graphite and a low-crystalline amorphous carbon, and the like can further be used.

As the oxide, one of silicon oxide, tin oxide, indium oxide, zinc oxide, lithium oxide, phosphoric acid and boric acid or a composite thereof can be used. Particularly silicon oxide can be preferably used. The structure preferably has an amorphous state. This is because silicon oxide is stable and causes no reaction with other compounds, and because the amorphous structure does not induces deterioration caused by non-uniformity such as crystal grain boundaries and defects.

As film-formation method, vapor-deposition method, a CVD method and a sputtering method and the like can be used.

The lithium alloy is constituted of lithium and a metal which can be alloyed with lithium. The lithium alloy is constituted of, for example, a binary, ternary, or more multi-metal alloy of metals such as Al, Si, Pb, Sn, In, Bi, Ag, Ba, Ca, Hg, Pd, Pt, Te, Zn and La, with lithium. Particularly, metallic lithium and lithium alloy preferably have an amorphous state. This is because the amorphous structure hardly causes deterioration caused by non-uniformity such as crystal grain boundaries and defects.

Metallic lithium and lithium alloy can be suitably formed by a system including a melt cooling system, a liquid quenching system, an atomizing system, a vacuum vapor-deposition system, a sputtering system, a plasma CVD system, an optical CVD system, a thermal CVD system and a sol-gel system.

A positive electrode active substance contained in a positive electrode of a lithium ion secondary battery having the gel electrolyte for a lithium ion secondary battery according to the exemplary embodiment includes, for example, lithium-containing composite oxides such as $LiCoO_2$, $LiNiO_2$ and $LiMn_2O_4$. As the positive electrode active substance, material which is obtained by replacing a part of transition metal of the lithium-containing composite oxides with other element can be used.

A lithium-containing composite oxide having a plateau of 4.5 V or higher vs. a counter electrode potential of metallic lithium may be used. Examples of the lithium-containing composite oxide include a spinel-type lithium-manganese composite oxide, an olivine-type lithium-containing composite oxide and an inverse-spinel-type lithium-containing composite oxide. The lithium-containing composite oxide includes, for example, a compound represented by $Li_a(M_xMn_{2-x})O_4$ (here, 0<x<2; 0<a<1.2; and M is at least one selected from the group consisting of Ni, Co, Fe, Cr and Cu).

In a battery constitution of a lithium ion secondary battery according to the exemplary embodiment, as an electrode structure, a laminated body or a wound body can be utilized, and as an outer package, an aluminum laminate outer package or a metal outer package can be used. Further, the battery capacity is not limited.

Since the gel electrolyte according to the exemplary embodiment does not need a radical polymerization initiator such as an organic peroxide for gelation, an oxo-acid ester derivative of phosphorus and a disulfonate ester are not decomposed during thermal polymerization. Further since the radical polymerization initiator is unnecessary for a battery, battery characteristic does not fall due to the influence of leftovers after the polymerization. The solution leakage can be prevented because of a gel electrolyte.

According to the exemplary embodiment, a disulfonate ester which forms an SEI having a very large suppression effect of the reductive decomposition is contained, thereby can suppress the reductive decomposition of an oxo-acid ester derivative of phosphorus on a negative electrode active substance. The concurrent presence of the disulfonate ester can suppress an increase of resistance due to the reductive decomposition of the oxo-acid ester derivative of phosphorus over a long period, and thereby can provide good life characteristics over a long period.

According to the exemplary embodiment, since the reductive decomposition of an oxo-acid ester derivative of phosphorus can be suppressed over a long period, the oxo-acid ester derivative of phosphorus can be present in an effective amount to suppress the combustibility in a gel electrolyte even after a long period usage; therefore, high safety can be provided over a long period.

Additionally, since the gel electrolyte has no apprehension of solution leakage, and close adhesivity between both electrodes of a negative electrode and a positive electrode and a separator is good, good life characteristics can be provided over a long period.

Further in the exemplary embodiment, the amount of generated gas in the first-time charging tends to decrease. The reason of the decrease of the amount of generated gas is presumably because, in the exemplary embodiment, the concurrent presence of an oxo-acid ester derivative of phosphorus and a disulfonate ester in the gel electrolyte can form an SEI incorporating part of the oxo-acid ester derivative of phosphorus by a reaction mechanism which is different from an SEI formation in a nonaqueous electrolyte solution containing only a disulfonate ester. It is also presumed that since further reductive decomposition of the oxo-acid ester derivative of phosphorus present in the gel electrolyte can be suppressed on the SEI thus formed, the SEI by the disulfonate ester incorporating the oxo-acid ester derivative of phosphorus is firmly formed and the suppression effect of the reductive decomposition on gel electrolyte components including the oxo-acid ester derivative of phosphorus probably becomes large. The effect presumably gives good life characteristics. High safety can further be provided over a long period because an oxo-acid ester derivative of phosphorus can be suppressed in reductive decomposition over a long period.

EXAMPLES

Hereinafter, the exemplary embodiments will be described in detail by way of Examples by reference to drawings. The present invention is not limited to the following Examples.

Figure 2:
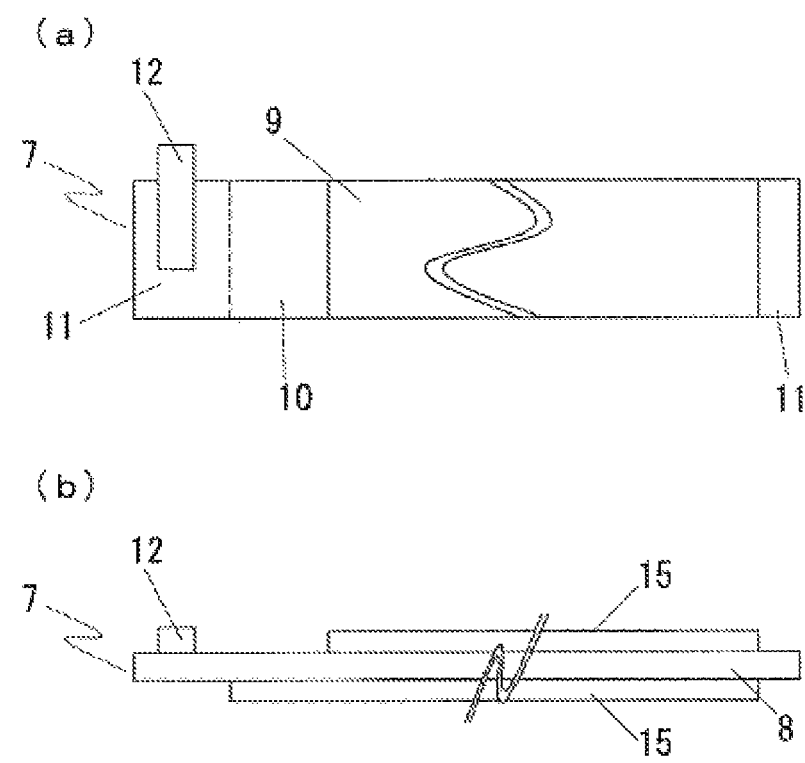
FIG. 2 is a schematic diagram to illustrate a constitution of a negative electrode of the lithium ion secondary battery.
Figure 3:
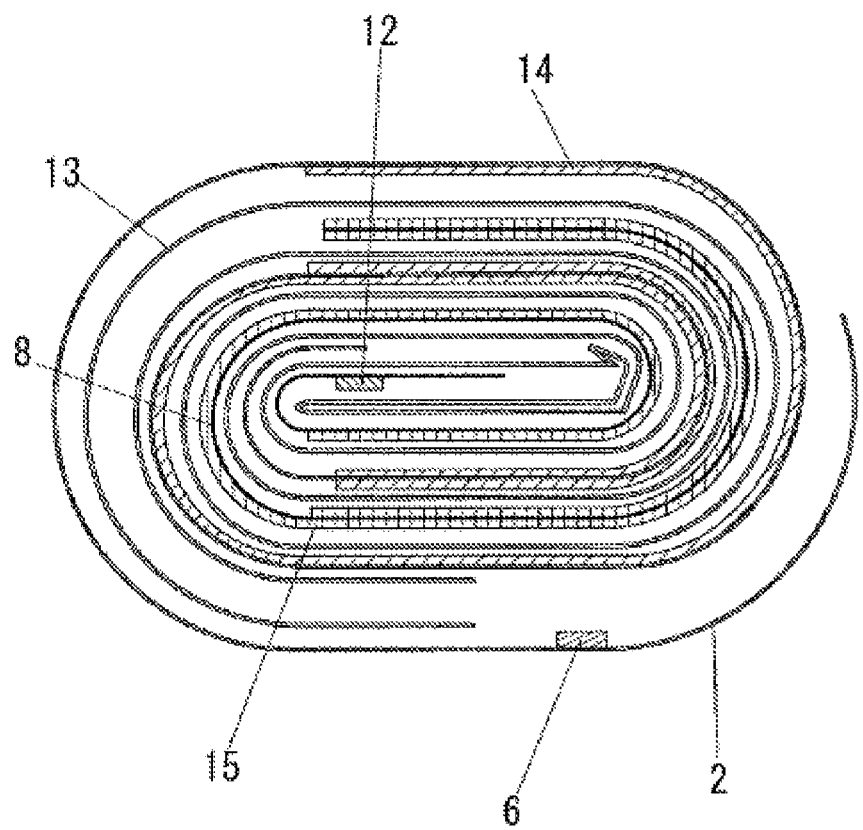
FIG. 3 is a diagram to illustrate a constitution of an electrode assembly after being wound of the lithium ion secondary battery.

FIG. 1 is a schematic diagram illustrating a constitution of a positive electrode of a lithium ion battery of Example 1. FIG. 2 is a schematic diagram illustrating a constitution of a negative electrode of the lithium ion battery of Example 1. FIG. 3 is a schematic cross-sectional diagram illustrating a constitution of an electrode assembly after being wound of the lithium ion battery of Example 1.

Example 1

First, fabrication of a positive electrode will be described with reference to FIG. 1. 85% by mass of $LiMn_2O_4$ as a positive electrode active substance, 7% by mass of acetylene black as a conductive auxiliary material and 8% by mass of polyvinylidene fluoride as a binder were mixed to obtain a mixture, and then N-methylpyrrolidone was added to the mixture, and further mixed to thereby prepare a positive electrode slurry. The positive electrode slurry was applied on both surfaces of an Al foil 2 having a thickness of 20 μm as a current collector by a doctor blade method so that the thickness after roll pressing became 160 μm, dried at 120° C. for 5 min, and thereafter subjected to a roll pressing step to thereby form positive electrode active substance-applied portions 3. Positive electrode active substance-unapplied portions 5, on which no positive electrode active substance was applied, were provided on either surface of both end portions of the foil. A positive electrode conductive tab 6 was provided on one of the positive electrode active substance-unapplied portions 5. A positive electrode active substance-one surface-applied portion 4, which was a part of one surface having the positive electrode active substance applied only on the one surface, was provided adjacent to the positive electrode active substance-unapplied portion 5 provided with the positive electrode conductive tab 6. A positive electrode 1 was fabricated by the above method.

Fabrication of a negative electrode will be described with reference to FIG. 2. 90% by mass of graphite as a negative electrode active substance, 1% by mass of acetylene black as a conductive auxiliary material and 9% by mass of polyvinylidene fluoride as a binder were mixed to obtain a mixture, and N-methylpyrrolidone was added to the mixture, and further mixed to thereby prepare a negative electrode slurry. The negative electrode slurry was applied on both surfaces of a Cu foil 8 having a thickness of 10 μm to become a current collector by a doctor blade method so that the thickness after roll pressing became 120 μm, dried at 120° C. for 5 min, and thereafter subjected to a roll pressing step to thereby form negative electrode active substance-applied portions 9. Negative electrode active substance-unapplied portions 11, on which no negative electrode active substance was applied, were provided on either surface of both end portions of the foil. A negative electrode conductive tab 12 was provided on one of the negative electrode active substance-unapplied portions 11. A negative electrode active substance-one surface-applied portion 10, which was a part of one surface having the negative electrode active substance applied only on the one surface, was provided adjacent to the negative electrode active substance-unapplied portion 11 provided with the negative electrode conductive tab 12. A negative electrode 7 was fabricated by the above method.

Fabrication of an electrode assembly will be described with reference to FIG. 3. A fused and cut portion of two sheets of separator 13 composed of a polypropylene microporous membrane having a membrane thickness of 25 μm and a porosity of 55% subjected to a hydrophilicizing treatment was fixed and wound to a winding core of a winding apparatus, and front ends of the positive electrode 1 (FIG. 1) and the negative electrode 7 (FIG. 2) were introduced. The side of the positive electrode opposite to the connection portion of the positive electrode conductive tab 6 was made to be front end side of the positive electrode 1 and the side of the connection portion of the negative electrode conductive tab 12 were made to be the front end side of the negative electrode 7. The negative electrode was disposed between the two sheets of the separator, and the positive electrode was disposed on the upper surface of the separator, and these were wound by rotating the winding core to thereby form an electrode assembly (hereinafter, referred to as a jelly roll (J/R)).

The J/R was accommodated in an embossed laminate outer package, the positive electrode conductive tab 6 and the negative electrode conductive tab 12 were led out, and one side of the laminate outer package was folded back, and thermally fused with a portion for solution injection being left unfused.

Preparation of a polymer solution will be described. Ethyl acrylate as a second monomer and (3-ethyl-3-oxetanyl)methyl methacrylate as a first monomer were added in respective proportions of 74% by mass and 26% by mass. A reaction solvent of ethylene carbonate (EC)/diethyl carbonate (DEC)=30/70 (in volume ratio) was used. 2,500 ppm of N,N'-azobisisobutyronitrile as a polymerization initiator with respect to the monomer weight was added. The mixture was heated and reacted at 65 to 70° C. under introduction of a dry nitrogen gas, and thereafter cooled to room temperature. Thereafter, EC/DEC=30/70 (in volume ratio) as a diluent solvent was added, and the whole was stirred and dissolved until the whole became homogeneous, to thereby obtain a polymer solution which contains 4.0% by mass of polymer having molecular weight of 200,000 and EC/DEC=30/70 (in volume ratio).

Preparation of a pregel solution will be described. A pregel solution was prepared by using the polymer solution containing EC:DEC=30/70 (in volume ratio) with the 4.0% by mass of polymer having molecular weight of 200,000, tri(2,2,2-trifluoroethyl) phosphate, (EC)/(DEC)=30/70 (in volume ratio), a compound No. 2 in Table 1, and $LiPF_6$. More specifically, these materials were blended so that the polymer was 2.0% by mass; tri(2,2,2-trifluoroethyl)phosphate was 5.0% by mass; the compound No. 2 in Table 1 was 2.0% by mass; and LiPF$_6$ was 1.2 mol/L, to thereby fabricate the pregel solution.

Then, the pregel solution was injected from the laminate solution injection portion, and impregnated under vacuum. Then, the solution injection portion was thermally fused. Then, the injected pregel solution was heated and polymerized for gelation at 60° C. for 24 hours. A battery was obtained by the above steps.

A discharge capacity acquired when the obtained battery was CC-CV charged (an upper-limit voltage: 4.2 V, a current: 0.2 C, a CV time: 1.5 hours), and thereafter CC discharged (a lower-limit voltage: 3.0 V, a current: 0.2 C) was defined as an initial capacity. The proportion of the acquired initial capacity to a design capacity is shown in Table 3.

A cycle test of the obtained battery is carried out by CC-CV charge (an upper-limit voltage: 4.2 V, a current: 1 C, a CV time: 1.5 hours) and CC discharge (a lower-limit voltage: 3.0 V, a current: 1 C), and either was carried out at 45° C. The capacity maintenance rate was defined as a proportion of a discharge capacity at the 1,000th cycle to a discharge capacity at the first cycle. The capacity maintenance rate is shown in Table 3.

A combustion test is carried out by placing the battery after the cycle test at a height of 10 cm above the tip of the flame of a gas burner. The flame retardancy was judged as follows from the state of the vaporizing and burning electrolyte solution solvent. A case where the electrolyte solution was not ignited: ⊙; a case where even if ignition occurred, the fire went out after 2 to 3 sec: ○; a case where even if ignition occurred, the fire went out within 10 sec: Δ; and a case where the fire continued to burn for 10 sec: ×.

Example 2

Example 2 was carried out in the same manner as Example 1, except for mixing 10% by mass of tri(2,2,2-trifluoroethyl) phosphate (hereinafter, referred also to as PTTFE) to prepare a pregel solution.

Example 3

Example 3 was carried out in the same manner as Example 1, except for mixing 20% by mass of PTTFE to prepare a pregel solution.

Example 4

Example 4 was carried out in the same manner as Example 1, except for mixing 40% by mass of PTTFE to prepare a pregel solution.

Example 5

Example 5 was carried out in the same manner as Example 1, except for mixing 20% by mass of di(2,2,2-trifluoroethyl) fluorophosphate (hereinafter, simply referred also to as ditrifluoroethyl fluorophosphate) in place of PTTFE to prepare a pregel solution.

Example 6

Example 6 was carried out in the same manner as Example 1, except for mixing 20% by mass of 2,2,2-trifluoroethyl difluorophosphate (hereinafter, simply referred also to as trifluoroethyl difluorophosphate) in place of PTTFE to prepare a pregel solution.

Example 7

Example 7 was carried out in the same manner as Example 3, except for mixing 2% by mass of a compound No. 4 in place of the compound No. 2 in Table 1 to prepare a pregel solution.

Example 8

Example 8 was carried out in the same manner as Example 3, except for mixing 2% by mass of a compound No. 101 in Table 2 in place of the compound No. 2 in Table 1 to prepare a pregel solution.

Example 9

Example 9 was carried out in the same manner as Example 3, except for mixing 2% by mass of a compound No. 102 in Table 2 in place of the compound No. 2 in Table 1 to prepare a pregel solution.

Example 10

Example 10 was carried out in the same manner as Example 3, except for further mixing 2% by mass of fluoroethylene carbonate (FEC) to prepare a pregel solution.

Comparative Example 1

Comparative Example 1 was carried out in the same manner as Example 3, except for not mixing the compound No. 2 in Table 1 to prepare a pregel solution.

Comparative Example 2

Comparative Example 2 was carried out in the same manner as Example 3, except for not mixing the compound No. 2 in Table 1 and mixing 3% by mass of 1,3-propane sultone (PS) to prepare a pregel solution.

Comparative Example 3

Comparative Example 3 was carried out in the same manner as Example 3, except for not mixing the compound No. 2 in Table 1 and mixing 5% by mass of vinylene carbonate (VC) to prepare a pregel solution.

Results of Examples 1 to 10 and Comparative Examples 1 to 3 are shown in Table 3.

TABLE 3

| | Negative electrode active substance/electrolyte | Oxo-acid ester of phosphorus | | Additive | | Initial capacity | Capacity maintenance | Flame |
| --- | --- | --- | --- | --- | --- | --- | --- | --- |
| | | Kind | Content (%) | Kind | Content (%) | (%) | rate (%) | retardancy |
| Example 1 | graphite/gel | PTTFE | 5 | No. 2 | 2 | 93 | 82 | ○ |
| Example 2 | graphite/gel | PTTFE | 10 | No. 2 | 2 | 93 | 80 | ⊙ |
| Example 3 | graphite/gel | PTTFE | 20 | No. 2 | 2 | 93 | 80 | ⊙ |
| Example 4 | graphite/gel | PTTFE | 40 | No. 2 | 2 | 85 | 68 | ⊙ |

TABLE 3-continued

| | Negative electrode active substance/electrolyte | Oxo-acid ester of phosphorus Kind | Content (%) | Additive Kind | Content (%) | Initial capacity (%) | Capacity maintenance rate (%) | Flame retardancy |
|---|---|---|---|---|---|---|---|---|
| Example 5 | graphite/gel | Di(trifluoroethyl) fluorophosphonate | 20 | No. 2 | 2 | 91 | 80 | ⊙ |
| Example 6 | graphite/gel | Trifluoroethyl difluorophosphate | 20 | No. 2 | 2 | 91 | 79 | ⊙ |
| Example 7 | graphite/gel | PTTFE | 20 | No. 4 | 2 | 89 | 75 | ⊙ |
| Example 8 | graphite/gel | PTTFE | 20 | No. 101 | 2 | 90 | 70 | ⊙ |
| Example 9 | graphite/gel | PTTFE | 20 | No. 102 | 2 | 87 | 72 | ⊙ |
| Example 10 | graphite/gel | PTTFE | 20 | No. 2 + FEC | 4 (2 + 2) | 82 | 85 | ⊙ |
| Comparative Example 1 | graphite/gel | PTTFE | 20 | — | — | 93 | 23 | X |
| Comparative Example 2 | graphite/gel | PTTFE | 20 | PS | 3 | 87 | 49 | Δ |
| Comparative Example 3 | graphite/gel | PTTFE | 20 | VC | 5 | 83 | 56 | Δ |

In Table 3, No. 2 and No. 4 are compounds No. 2 and No. 4 shown in Table 1, respectively; No. 101 and No. 102 are compounds No. 101 and No. 102 shown in Table 2, respectively; and FEC is fluoroethylene carbonate, PS is 1,3-propane sultone, and VC is vinylene carbonate.

As shown in Examples 1 to 4, although the capacity maintenance rate after 1,000th cycle tended to slightly decrease as the content of a phosphate ester was increased, the flame retardancy of the electrolyte solution of the battery after the evaluation was very good. Comparing Examples 3 and 5 to 10 and Comparative Examples 1 to 3 where the same amount of a phosphate ester is added, in Examples 3 and 5 to 10 where a disulfonate ester is added, good capacity maintenance rates and very good flame retardancy were obtained. In Example 10 where FEC was further added, a good capacity maintenance rate and very good flame retardancy were obtained.

From the above, since a better SEI could be formed by using a disulfonate ester and an oxo-acid ester derivative of phosphorus, the reductive decomposition of the oxo-acid ester derivative of phosphorus in the gel electrolyte could be suppressed over a long period, thereby can provide good life characteristics, and thereby can provide high flame retardancy over a long period.

Example 11

Example 11 was carried out in the same manner as Example 3, except for using a silicon-based material in place of the graphite as a negative electrode material in Example 3. The fabrication method of the negative electrode will be described hereinafter. First, 90% by mass of silicon, 1% by mass of acetylene black as a conductive auxiliary agent and 9% by mass of a polyimide binder as a binder were mixed, and N-methylpyrrolidone was added to the mixture and further mixed to thereby prepare a negative electrode slurry. The negative electrode slurry was applied on both surfaces of a Cu foil having a thickness of 10 μm to become a current collector so that the thickness after roll pressing became 80 μm, dried at 120° C. for 5 min, subjected to a pressing step, and further additionally dried at 300° C. for 10 min to thereby form negative electrode active substance-applied portions 9.

Example 12

Example 12 was carried out in the same manner as Example 11, except for mixing 2% by mass of a compound No. 101 in Table 2 in place of the compound No. 2 in Table 1 to prepare a pregel solution.

Comparative Example 4

Comparative Example 4 was carried out in the same manner as Example 11, except for not mixing the compound No. 2 in Table 1 and mixing 3% by mass of PS to prepare a pregel solution.

Comparative Example 5

Comparative Example 5 was carried out in the same manner as Example 11, except for not mixing the compound No. 2 in Table 1 and mixing 5% by mass of VC to prepare a pregel solution.

Results of Examples 12 and 13 and Comparative Examples 4 and 5 are shown in Table 4.

TABLE 4

| | Negative electrode active substance/electrolyte | Oxo-acid ester of phosphorus Kind | Content (%) | Additive Kind | Content (%) | Initial capacity (%) | Capacity maintenance rate (%) | Flame retardancy |
|---|---|---|---|---|---|---|---|---|
| Example 11 | silicon/gel | PTTFE | 20 | No. 2 | 2 | 74 | 71 | ⊙ |
| Example 12 | silicon/gel | PTTFE | 20 | No. 101 | 2 | 65 | 63 | ⊙ |
| Comparative Example 4 | silicon/gel | PTTFE | 20 | PS | 3 | 65 | 40 | Δ |
| Comparative Example 5 | silicon/gel | PTTFE | 20 | VC | 5 | 56 | 41 | Δ |

In Table 4, No. 2 is the compound No. 2 shown in Table 1; No. 101 is the compound No. 101 shown in Table 2; and PS is 1,3-propane sultone, and VC is vinylene carbonate.

From Table 4, also in the case where a silicon material was used in place of a graphite, the SEI by a disulfonate ester could suppress reductive decomposition of an oxo-acid ester derivative of phosphorus to thereby provide a good capacity maintenance rate as life characteristics, and consequently, high flame retardancy could be provided over a long period.

Example 13

Example 13 was carried out in the same manner as Example 3, except for using ethyl acrylate as the second monomer and glycidyl methacrylate as the first monomer.

Example 14

Example 14 was carried out in the same manner as Example 3, except for using ethyl acrylate as the second monomer and 3,4-epoxycyclohexylmethyl methacrylate as the first monomer.

Example 15

Example 15 was carried out in the same manner as Example 3, except for using methyl methacrylate as the second monomer and (3-ethyl-3-oxetanyl)methyl methacrylate as the first monomer.

Example 16

Example 16 was carried out in the same manner as Example 3, except for using methyl methacrylate as the second monomer and glycidyl methacrylate as the first monomer.

Example 17)

Example 17 was carried out in the same manner as Example 3, except for using methyl methacrylate as the second monomer and 3,4-epoxycyclohexylmethyl methacrylate as the first monomer.

Example 18

Example 18 was carried out in the same manner as Example 3, except for using propyl methacrylate as the second monomer and (3-ethyl-3-oxetanyl)methyl methacrylate as the first monomer.

Example 19

Example 19 was carried out in the same manner as Example 3, except for using propyl methacrylate as the second monomer and glycidyl methacrylate as the first monomer.

Example 20

Example 20 was carried out in the same manner as Example 3, except for using propyl methacrylate as the second monomer and 3,4-epoxycyclohexylmethyl methacrylate as the first monomer.

Example 21

Example 21 was carried out in the same manner as Example 3, except for using methoxytriethylene glycol methacrylate as the second monomer and (3-ethyl-3-oxetanyl) methyl methacrylate as the first monomer.

Example 22)

Example 22 was carried out in the same manner as Example 3, except for using methoxytriethylene glycol methacrylate as the second monomer and glycidyl methacrylate as the first monomer.

Example 23

Example 23 was carried out in the same manner as Example 3, except for using methoxytriethylene glycol methacrylate as the second monomer and 3,4-epoxycyclohexylmethyl methacrylate as the first monomer.

Results of Example 3 and 13 to 23 are shown in Table 5.

TABLE 5

| | Second monomer | First monomer | Oxo-acid ester of phosphorus | | Additive | | Initial capacity (%) | Capacity maintenance rate (%) | Flame retardancy |
|---|---|---|---|---|---|---|---|---|---|
| | | | Kind | Content (%) | Kind | Content (%) | | | |
| Example 3 | ethyl acrylate | (3-ethyl-3-oxetanyl)methyl methacrylate | PTTFE | 20 | No. 2 | 2 | 93 | 80 | ⊙ |
| Example 13 | ethyl acrylate | glycidyl methacrylate | PTTFE | 20 | No. 2 | 2 | 92 | 77 | ⊙ |
| Example 14 | ethyl acrylate | 3,4-epoxycyclohexylmethyl methacrylate | PTTFE | 20 | No. 2 | 2 | 92 | 78 | ⊙ |
| Example 15 | methyl methacrylate | (3-ethyl-3-oxetanyl)methyl methacrylate | PTTFE | 20 | No. 2 | 2 | 93 | 77 | ⊙ |
| Example 16 | methyl methacrylate | glycidyl methacrylate | PTTFE | 20 | No. 2 | 2 | 93 | 76 | ⊙ |
| Example 17 | methyl methacrylate | 3,4-epoxycyclohexylmethyl methacrylate | PTTFE | 20 | No. 2 | 2 | 92 | 76 | ⊙ |
| Example 18 | propyl methacrylate | (3-ethyl-3-oxetanyl)methyl methacrylate | PTTFE | 20 | No. 2 | 2 | 92 | 78 | ⊙ |
| Example 19 | propyl methacrylate | glycidyl methacrylate | PTTFE | 20 | No. 2 | 2 | 92 | 78 | ⊙ |
| Example 20 | propyl methacrylate | 3,4-epoxycyclohexylmethyl methacrylate | PTTFE | 20 | No. 2 | 2 | 93 | 77 | ⊙ |
| Example 21 | methoxytriethylene glycol methacrylate | (3-ethyl-3-oxetanyl)methyl methacrylate | PTTFE | 20 | No. 2 | 2 | 93 | 76 | ⊙ |
| Example 22 | methoxytriethylene glycol methacrylate | glycidyl methacrylate | PTTFE | 20 | No. 2 | 2 | 92 | 77 | ⊙ |
| Example 23 | methoxytriethylene glycol methacrylate | 3,4-epoxycyclohexylmethyl methacrylate | PTTFE | 20 | No. 2 | 2 | 91 | 76 | ⊙ |

In Table 5, No. 2 is the compound No. 2 in Table 1.

From the above, the SEI by a disulfonate ester, not depending on the polymer constitution, could suppress the reductive decomposition of an oxo-acid ester of phosphorus over a long period to be thereby able to provide good life characteristics, and consequently, high safety could be provided over a long period.

Comparative Example 6

Comparative Example 6 was carried out in the same manner as Example 1, except for fabricating the gel electrolyte of Example 1 as follows.

First, a pregel solution was fabricated by mixing 1.2 mol/L of $LiPF_6$, EC/DEC=30/70 (in volume ratio), 5% by mass of PTTFE, 2% by mass of the compound No. 2 in Table 1, 3.8% by mass and 1% by mass of triethylene glycol diacrylate and trimethylolpropane triacrylate as gelating agents, respectively, and 0.5% by mass of t-butyl peroxypivalate as a polymerization initiator. First, the PTTFE and the compound No. 2 in Table 1 were mixed in a solution containing $LiPF_6$ and the EC/DEC=30/70 (in volume ratio), and then the gelating agent was added and well mixed, and thereafter the polymerization initiator was mixed.

Then, the pregel solution was injected from the solution injection portion, and impregnated under vacuum. Then, the pregel solution was polymerized at 80° C. for 2 hours for gelation. A battery was obtained by the above steps, and the measurements were carried out in the same manner as Example 1.

Comparative Example 7

Comparative Example 7 was carried out in the same manner as Comparative Example 6, except for mixing 10% by mass of PTTFE.

Comparative Example 8

Comparative Example 8 was carried out in the same manner as Comparative Example 6, except for mixing 20% by mass of PTTFE.

Results of Examples 1 to 3 and Comparative Examples 6 to 8 are shown in Table 6.

8, the flame retardancy was decreased due to the decomposition of a phosphate ester by a polymerization initiator in the gel electrolyte. It is also presumed that since an SEI is difficult to be normally formed due to the decomposition of a phosphate ester by a polymerization initiator, the cycle maintenance rate decreased. By contrast, the battery comprising the gel electrolyte according to the exemplary embodiment could suppress the reductive decomposition of an oxo-acid ester of phosphorus over a long period to thereby provide good life characteristics, and consequently, high safety could be provided over a long period.

The present application claims the priority to Japanese Patent Application 2010-290545, filed on Dec. 27, 2010, the disclosure of which is herein incorporated by reference in its entirety.

Hitherto, the present invention has been described by reference to exemplary embodiments and Examples, but the present invention is not limited to the exemplary embodiments and the Examples. Various modifications and changes understandable by those skilled in the art may be made in the constitution and detail of the present invention within the scope of the present invention.

INDUSTRIAL APPLICABILITY

The exemplary embodiments can be utilized, additionally, for energy storage devices such as electric double-layer capacitors and lithium ion capacitors.

REFERENCE SIGNS LIST

1: positive electrode
2: Al foil
3: positive electrode active substance applied portion
4: positive electrode active substance-one surface-applied portion
5: positive electrode active substance-unapplied portion
6: positive electrode conductive tab
7: negative electrode
8: Cu foil
9: negative electrode active substance applied portion
10: negative electrode active substance-one surface-applied portion

TABLE 6

|  | Monomer | Polymerization initiator for gelation | Oxo-acid ester of phosphorus Kind | Content (%) | Additive Kind | Content (%) | Initial capacity (%) | Capacity maintenance rate (%) | Flame retardancy |
|---|---|---|---|---|---|---|---|---|---|
| Example 1 | ethyl acrylate, (3-ethyl-3-oxetanyl)methyl methacrylate | cationic polymerization initiator ($LiPF_6$) | PTTFE | 5 | No. 2 | 2 | 93 | 82 | ○ |
| Example 2 |  |  |  | 10 | No. 2 | 2 | 93 | 80 | ⊙ |
| Example 3 |  |  |  | 20 | No. 2 | 2 | 93 | 80 | ⊙ |
| Comparative Example 6 | triethylene glycol diacrylate, trimethylolpropane triacrylate | t-butyl peroxypivalate | PTTFE | 5 | No. 2 | 2 | 76 | 69 | X |
| Comparative Example 7 |  |  |  | 10 | No. 2 | 2 | 75 | 55 | Δ |
| Comparative Example 8 |  |  |  | 20 | No. 2 | 2 | 71 | 51 | ○ |

In Table 6, No. 2 is the compound No. 2 in Table 1.

It is found that Comparative Examples 6 to 8 exhibited a lower suppression effect of combustion after the cycle than Examples 1 to 3 even with the same amount of a phosphate ester added. It is presumed that in Comparative Examples 6 to 11: negative electrode active substance-unapplied portion
12: negative electrode conductive tab
13: insulating porous sheet
14: positive electrode active substance layer
15: negative electrode active substance layer

What is claimed is:
1. A gel electrolyte for a lithium ion secondary battery, comprising:
   a lithium salt;
   a copolymer of at least one first monomer selected from compounds represented by chemical formulae (1) and (2) and a second monomer represented by chemical formula (4);
   at least one oxo-acid ester derivative of phosphorus selected from compounds represented by chemical formulae (5) to (7); and
   at least one disulfonate ester selected from a cyclic-chain-type disulfonate ester represented by chemical formula (8) and a linear-chain-type disulfonate ester represented by chemical formula (9):

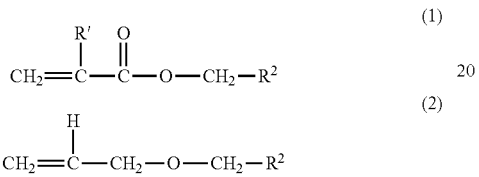

wherein in formula (1), $R^1$ represents H or $CH_3$; and in formulae (1) and (2), $R^2$ represents one of substituents represented by the following formula (3),

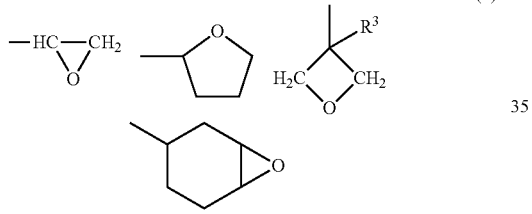

wherein in formula (3), $R^3$ represents an alkyl group having 1 to 6 carbon atoms,

wherein in formula (4), $R^4$ represents H or $CH_3$; $R^5$ represents —$COOCH_3$, —$COOC_2H_5$, —$COOC_3H_7$, —$COOC_4H_9$, —$COOCH_2CH(CH_3)_2$, —$COO(CH_2CH_2O)_nCH_3$, —$COO(CH_2CH_2O)_nC_4H_9$, —$COO(CH_2CH_2CH_2O)_nCH_3$, —$COO(CH_2CH(CH_3)O)_nCH_3$, —$COO(CH_2CH(CH_3)O)_nC_2H_5$, —$OCOCH_3$, —$OCOC_2H_5$, or —$CH_2OC_2H_5$; and n represents an integer of 1 to 3,

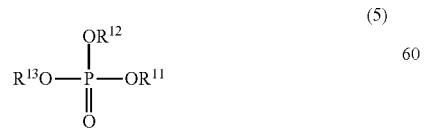

wherein in formula (5), $R^{11}$, $R^{12}$ and $R^{13}$ each independently represent any group selected from an alkyl group, an aryl group, an alkenyl group, cyano group, phenyl group, an amino group, nitro group, an alkoxy group, a cycloalkyl group and a halogen-substituted group thereof; and two of or all of $R^{11}$, $R^{12}$ and $R^{13}$ may be bonded to form a ring structure,

wherein in formula (6), $R^{21}$ and $R^{22}$ each independently represent any group selected from an alkyl group, an aryl group, an alkenyl group, cyano group, phenyl group, an amino group, nitro group, an alkoxy group, a cycloalkyl group and a halogen-substituted group thereof; $R^{21}$ and $R^{22}$ may be bonded to form a ring structure; and $X^{21}$ represents a halogen atom,

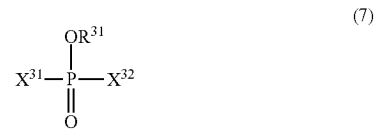

wherein in formula (7), $R^{31}$ represents any group selected from an alkyl group, an aryl group, an alkenyl group, cyano group, phenyl group, an amino group, nitro group, an alkoxy group, a cycloalkyl group and a halogen-substituted group thereof; and $X^{31}$ and $X^{32}$ each independently represent a halogen atom,

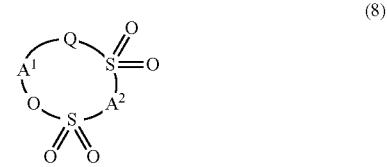

wherein in formula (8), Q represents an oxygen atom, a methylene group or a single bond; $A^1$ represents a substituted or unsubstituted alkylene group which may be branched and has 1 to 5 carbon atoms, a carbonyl group, a sulfinyl group, a substituted or unsubstituted perfluoroalkylene group which may be branched and has 1 to 5 carbon atoms, a substituted or unsubstituted fluoroalkylene group which may be branched and has 2 to 6 carbon atoms, a substituted or unsubstituted alkylene group which contains an ether bond and may be branched and has 1 to 6 carbon atoms, a substituted or unsubstituted perfluoroalkylene group which contains an ether bond and may be branched and has 1 to 6 carbon atoms, or a substituted or unsubstituted fluoroalkylene group which contains an ether bond and may be branched and has 2 to 6 carbon atoms; and $A^2$ represents a substituted or unsubstituted alkylene group, a substituted or unsubstituted fluoroalkylene group or an oxygen atom, and

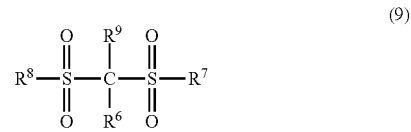

wherein in formula (9), $R^6$ and $R^9$ each independently represent an atom or a group selected from hydrogen atom, a substituted or unsubstituted alkyl group having 1 to 5 carbon atoms, a substituted or unsubstituted alkoxy group having 1 to 5 carbon atoms, a substituted or unsubstituted fluoroalkyl group having 1 to 5 carbon atoms, a polyfluoroalkyl group having 1 to 5 carbon atoms, —SO$_2$X$^3$ (X$^3$ is a substituted or unsubstituted alkyl group having 1 to 5 carbon atoms), —SY$^1$ (Y$^1$ is a substituted or unsubstituted alkyl group having 1 to 5 carbon atoms), —COZ (Z is hydrogen atom or a substituted or unsubstituted alkyl group having 1 to 5 carbon atoms), and a halogen atom; and R$^7$ and R$^8$ each independently represent an atom or a group selected from a substituted or unsubstituted alkyl group having 1 to 5 carbon atoms, a substituted or unsubstituted alkoxy group having 1 to 5 carbon atoms, a substituted or unsubstituted phenoxy group, a substituted or unsubstituted fluoroalkyl group having 1 to 5 carbon atoms, a polyfluoroalkyl group having 1 to 5 carbon atoms, a substituted or unsubstituted fluoroalkoxy group having 1 to 5 carbon atoms, a polyfluoroalkoxy group having 1 to 5 carbon atoms, hydroxyl group, a halogen atom, —NX$^4$X$^5$ (X$^4$ and X$^5$ are each independently hydrogen atom or a substituted or unsubstituted alkyl group having 1 to 5 carbon atoms), and —NY$^2$CONY$^3$Y$^4$ (Y$^2$ to Y$^4$ are each independently hydrogen atom or a substituted or unsubstituted alkyl group having 1 to 5 carbon atoms).

2. The gel electrolyte for a lithium ion secondary battery according to claim 1, wherein the gel electrolyte comprises 5 to 60% by mass of the oxo-acid ester derivative of phosphorus.

3. The gel electrolyte for a lithium ion secondary battery according to claim 1, wherein the gel electrolyte comprises 0.05 to 10% by mass of the disulfonate ester.

4. The gel electrolyte for a lithium ion secondary battery according to claim 1, further comprising 0.5 to 20% by mass of a halogen-containing cyclic-chain type carbonate ester.

5. A lithium ion secondary battery, comprising the gel electrolyte for a lithium ion secondary battery according to claim 1.

6. The gel electrolyte for a lithium ion secondary battery according to claim 2, wherein the gel electrolyte comprises 0.05 to 10% by mass of the disulfonate ester.

7. The gel electrolyte for a lithium ion secondary battery according to claim 2, further comprising 0.5 to 20% by mass of a halogen-containing cyclic-chain type carbonate ester.

8. The gel electrolyte for a lithium ion secondary battery according to claim 3, further comprising 0.5 to 20% by mass of a halogen-containing cyclic-chain type carbonate ester.

9. A lithium ion secondary battery, comprising the gel electrolyte for a lithium ion secondary battery according to claim 2.

10. A lithium ion secondary battery, comprising the gel electrolyte for a lithium ion secondary battery according to claim 3.

11. A lithium ion secondary battery, comprising the gel electrolyte for a lithium ion secondary battery according to claim 4.

* * * * *